(12) United States Patent
Salgaonkar et al.

(10) Patent No.: US 12,242,549 B1
(45) Date of Patent: Mar. 4, 2025

(54) UNIFIED SEARCH AND NAVIGATION FOR CLOUD-BASED SERVICES

(71) Applicant: Amazon Technologies, Inc., Seattle, WA (US)

(72) Inventors: Shantanu Salgaonkar, San Carlos, CA (US); Richard Douglas Suttles, San Jose, CA (US); Jack Ronald Russell, Palo Alto, CA (US); Rodrigo Castaneda, Berkeley, CA (US); Sonia Ramnani, Newark, CA (US); Rohan Murthy, San Francisco, CA (US); Ramachandran Madras Subramaniam, Sunnyvale, CA (US); Ankit Ashvin Bhodia, Mountain View, CA (US); Adit Ajaykumar Shah, San Francisco, CA (US); Shahebaj Mahemood Pathan, Sunnyvale, CA (US); Rachel Alicia Stanik, Palo Alto, CA (US)

(73) Assignee: Amazon Technologies, Inc., Seattle, WA (US)

( * ) Notice: Subject to any disclaimer, the term of this patent is extended or adjusted under 35 U.S.C. 154(b) by 335 days.

(21) Appl. No.: 17/364,834

(22) Filed: Jun. 30, 2021

(51) Int. Cl.
*G06F 16/9532* (2019.01)
*G06F 16/904* (2019.01)
*G06F 16/9535* (2019.01)
*G06F 16/9538* (2019.01)
*G06F 16/954* (2019.01)

(52) U.S. Cl.
CPC ........ *G06F 16/9532* (2019.01); *G06F 16/904* (2019.01); *G06F 16/9535* (2019.01); *G06F 16/9538* (2019.01); *G06F 16/954* (2019.01)

(58) Field of Classification Search
None
See application file for complete search history.

(56) References Cited

U.S. PATENT DOCUMENTS

| 2008/0082782 A1* | 4/2008 | Meijer | G06F 16/951 707/E17.108 |
| 2011/0193795 A1* | 8/2011 | Seidman | G06F 16/2428 345/173 |

(Continued)

*Primary Examiner* — Kannan Shanmugasundaram
(74) *Attorney, Agent, or Firm* — S. Scott Foster; Kowert, Hood, Munyon, Rankin & Goetzel, P.C.

(57) ABSTRACT

Methods, systems, and computer-readable media for unified search and navigation for cloud-based services are disclosed. A unified search system receives textual input entered using a search interface. The search interface is displayed in a user interface concurrently with a management console for a cloud provider network. Based (at least in part) on the textual input, the system performs a search using one or more indexes usable to determine service names and descriptive information for the services. The system generates search results comprising a portion of the service names and a portion of the descriptive information. The search results are displayed using a search results overlay that is displayed concurrently with at least a portion of the management console. The system receives additional input entered using the overlay and comprising a selection of a particular search result. Responsive to the selection, additional information associated with the particular search result is displayed.

20 Claims, 9 Drawing Sheets

(56) References Cited

U.S. PATENT DOCUMENTS

| | | | |
|---|---|---|---|
| 2012/0030199 A1* | 2/2012 | Mohajer | G06F 16/951 707/723 |
| 2016/0019636 A1* | 1/2016 | Adapalli | G06Q 40/00 705/26.81 |
| 2016/0315995 A1* | 10/2016 | Häusler | G06F 16/248 |

* cited by examiner

UNIFIED SEARCH AND NAVIGATION FOR CLOUD-BASED SERVICES

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, distributed systems housing significant numbers of interconnected computing systems have become commonplace. Such distributed systems may provide back-end services or systems that interact with clients. As the scale and scope of distributed systems have increased, the tasks of provisioning, administering, and managing system resources have become increasingly complicated. For example, the costs to manage distributed resources can increase with the complexity and scale of the resources.

Figure 1:
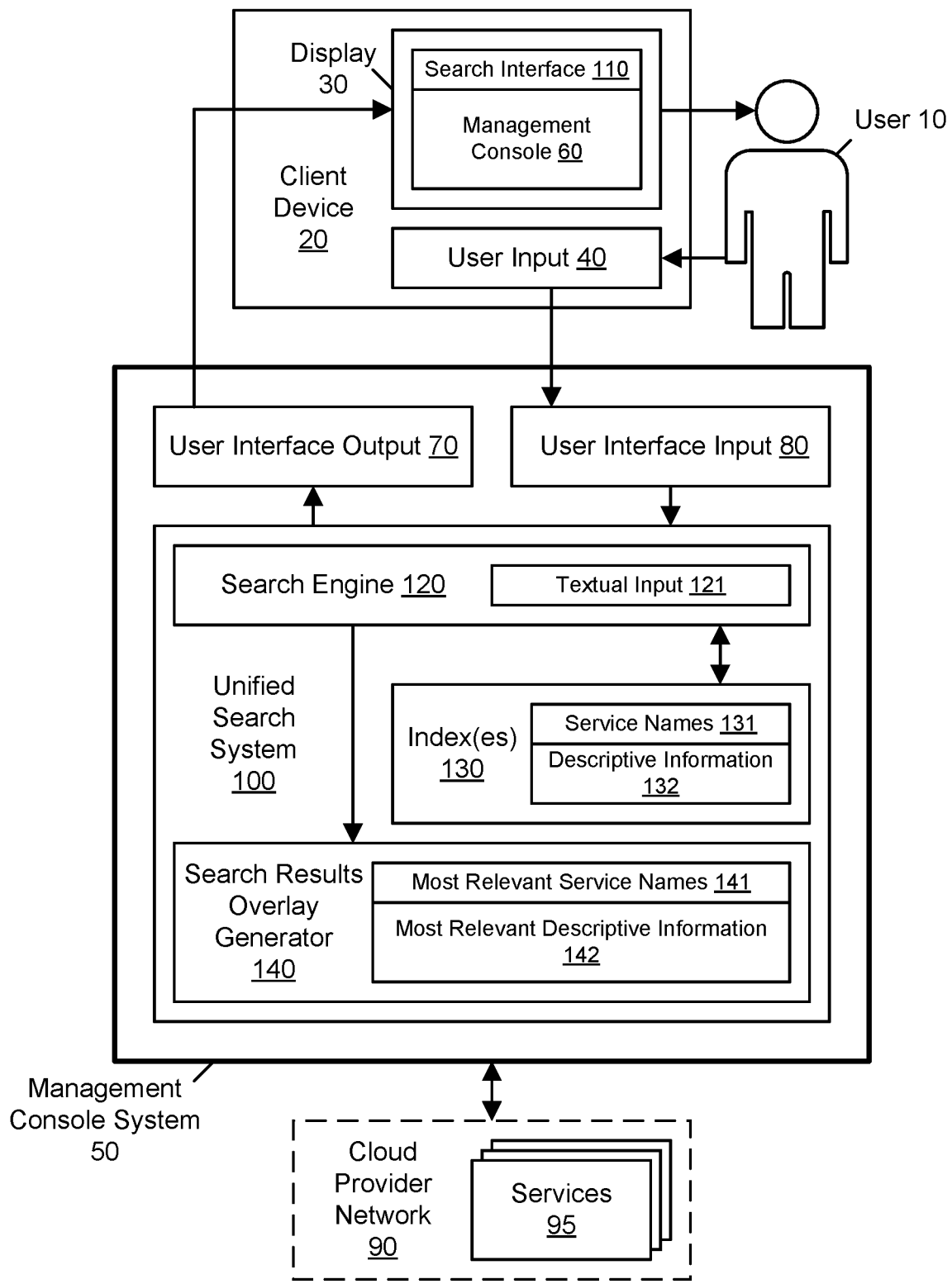
FIG. 1 illustrates an example system environment for unified search and navigation for cloud-based services, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning "having the potential to"), rather than the mandatory sense (i.e., meaning "must"). Similarly, the words "include," "including," and "includes" mean "including, but not limited to."

DETAILED DESCRIPTION OF EMBODIMENTS

Embodiments of methods, systems, and computer-readable media for unified search and navigation for cloud-based services are described. A cloud provider network may host a variety of services and resources on behalf of users. For example, the provider network may host one or more computing virtualization services that host virtual compute instances and/or one or more storage virtualization services that host storage instances. A management console for the provider network may be displayed in a user interface that permits users to view and configure aspects of their services and resources. With prior approaches, users may find it time-consuming and inconvenient to find specific elements of information in the management console.

The aforementioned challenges, among others, are addressed by embodiments of the techniques described herein, whereby a unified search system may permit users to easily find and navigate to items in a variety of categories associated with a cloud provider network. For example, searchable categories may include services, resources, features, documentation, products, and so on. A search bar or other search interface may be displayed in a user interface associated with the management console, e.g., on first accessing the console or in response to a keypress. The search interface may be displayed at the same time as information in the management console itself. After the user enters text into the search bar (e.g., at least two characters), the unified search system may generate an overlay with the top search results in more than one category of searchable items, e.g., services, resources, features, documentation, products, and so on. To prevent the user from losing any work or other context, the overlay may be displayed on top of the existing console page and not in a separate search results page. The user may easily select a search result (e.g., using "enter" to select the highlighted top result), and a management console for the selected service or additional information relevant to the selected search result may then be displayed. If the user instead chooses to hide or discard the search results overlay, then the full management console may be displayed again with no loss of data or context.

As one skilled in the art will appreciate in light of this disclosure, embodiments may be capable of achieving certain technical advantages, including some or all of the following: (1) reducing the use of computing resources and network resources by presenting search results using an overlay to existing information and not in a separate search results page that would be sent over a network to a client device; (2) reducing the time required to find and navigate to items in a variety of categories by using a unified search system with multiple indexes for the various categories; (3) reducing the use of computing resources and network resources by quickly redisplaying an original management console if a search results overlay is hidden, rather than presenting search results in a separate search results page that would replace the original console; and so on.

FIG. 1 illustrates an example system environment for unified search and navigation for cloud-based services, according to some embodiments. A management console system 50 may provide, to users such as user 10, a management console 60. The console 60 may also be referred to as a portal or management portal. The management console 60 may be displayed in a user interface (e.g., a graphical user interface) that permits users to view and configure aspects of services 95 and resources hosted in a cloud provider network 90. For example, the provider network 90 may host one or more computing virtualization services that host virtual compute instances and/or one or more storage virtualization services that host storage instances. Some of these services 95 and resources may be added to the user's account and configured or accessed according to user input. If the user 10 is properly authenticated and logged into the user's account, then the management console 60 may show metadata for specific services, metadata for specific resources, and related information linked to the user's account. When first accessed by the user 10 during a session, the management console 60 may represent a home page or high-level introduction to management of services 95 and resources of the provider network 90. Such a home page may present information associated with numerous services 95 and/or with the provider network 90 itself. For example, the higher-level management console 60 may include introductory sections such as "build a solution," "learn to build," "explore" the provider network, and so on. In some embodiments, the user 10 may interact with the initial form of management console 60 in order to drill down into more detailed management options, e.g., service-specific management consoles, consoles for management of particular resources, specific elements of documentation, and so on. As will be described in greater detail, the management console system 60 may include or be linked to a unified search system 100 that permits users of the provider network 90 to search for and navigate to service-specific management consoles, consoles for management of particular resources, specific elements of documentation, information about features of services, products offered via stores, and so on.

The management console system 50 may include a user interface output component 70 that generates elements of the user interface for presentation on a display 30 associated with a client device 20. For example, the management console system may include a web application, and the client device 20 may include client software such as a web browser that can display elements of the management console 60. Data sent from the output component 70 to the client device 20 (e.g., over one or more networks such as the Internet) may include data formatted according to suitable web standards such that the browser application on the client device can render aspects of the user interface according to the provided data. In some embodiments, the browser application may render for display a user interface that includes aspects of the management console 60 along with a search interface 110. In some embodiments, the client device 20 may include a desktop or laptop computer that executes web browser software or another client application that displays the search interface and console 60. In some embodiments, the client device 20 may include a mobile device (e.g., a smartphone, tablet, wearable device, and so on) that executes web browser software or another client application that displays the search interface and console 60. As will be described in greater detail, the search interface 110 may provide the user 10 with a unified search for a variety of elements such as individual services 95, individual resources of the cloud provider network 90 (e.g., as hosted by services), features of services, documentation for services, products sold via one or more stores, videos, blog posts, and so on. The search interface 110 may include a search bar or other user interface element(s) that permit the user to submit a search query, e.g., using keyboard-based input. In some embodiments, the search interface 110 may permit the user 10 to navigate quickly and easily within the user interface to elements such as individual services 95, individual resources of the cloud provider network 90 (e.g., as hosted by services), features of services, documentation for services, products sold via one or more stores, videos, blog posts, and so on.

The management console system 50 may include a user interface input component 80 that receives user input entered by the user 10 in association with the user interface. The client device 20 may include one or more user input 40 modalities such as keyboard-based input, mouse-based input, trackpad-based input, touchscreen-based input, voice input, and so on. Using these input modalities 40, the user 10 may provide user input associated with and/or prompted by aspects of the user interface, including the management console 60 and the search interface 110. For example, the user 10 may use a mouse, trackpad, or touchscreen to click on an option in the management console 60 in order to drill down into more detailed management options, e.g., service-specific management consoles, consoles for management of particular resources, specific elements of documentation, and so on. The management console system 50 may receive such input, generate additional elements of the user interface such as the specific management console information in response to the input, and use the output component 70 to send the newly generated user interface back to the client device 20 for display.

As another example, the user 10 may use a keyboard (e.g., a physical keyboard peripheral or a virtual keyboard displayed on a touchscreen) to enter textual input 121 into the search interface 110. In some embodiments, the search interface 110 may be displayed in response to initial keyboard-based input, e.g., one or more keypresses such as "alt-s" or "option-s." In some embodiments, the search interface 110 may be displayed automatically, e.g., when the console 60 is first displayed. Once the search interface has been displayed, the user 10 may type a series of characters representing a search query or the beginning of a search query. This textual input 121 may represent at least a portion of a search query that the client device 20 can send to the management console system 50 via the user interface input component 80. In some embodiments, the textual input 121 may be sent to the management console system 50 (e.g., over one or more networks such as the Internet) only after a sufficient number of characters (e.g., two) and/or a sufficient amount of time has elapsed since the beginning of text entry. In some embodiments, the search may be performed only after the minimum number of characters has been entered (e.g., two characters such as "ec"), and the search may be performed again or the results may be refined as the user enters additional characters (e.g., "ec2"). In some embodiments, the textual input 121 may be sent to the management console system 50 (e.g., over one or more networks such as the Internet) after the "return" or "enter" key is pressed. The management console system 50 may receive such textual input 121, use a unified search system 100 to determine search results for the search query, generate additional elements of the user interface such as a search results overlay to represent the search results, and use the output component 70 to send the newly generated user interface back to the client device 20 for display.

The unified search system 100 may include a search engine component 120 that performs a search based (at least in part) on the textual input 121. In some embodiments, the search engine 120 may use a component such as Elasticsearch to index searchable items and perform searches. To determine relevant search results given textual input 121, the search engine 120 may use one or more indexes 130. The index(es) 130 may be generated by a search engine (e.g., Elasticsearch) based on ingestion of data such as service names, service descriptions, features, documentation, product descriptions, resource identifiers, and so on. The index(es) 130 may be usable to quickly determine one or more service names 131 that are relevant to the search query. The index(es) 130 may be usable to quickly determine one or more elements of descriptive information 132 that are relevant to the search query. One of the index(es) 130 may include a collection of documents or data sets that are related to each other. Each document may correlate a set of keys (e.g., names of fields or properties) with their corresponding values (e.g., strings, numbers, Booleans, dates, arrays of values, geolocations, or other types of data). In some embodiments, the index(es) 130 may include a data structure called an inverted index that allows very fast full-text searches. An inverted index may list every unique word that appears in any document and may identify all of the documents each word occurs in. During the indexing process, the search engine (e.g., Elasticsearch) may store documents and build an inverted index to make the document data searchable in near real-time.

The search engine 120 may determine search results in more than one category, such as individual services 95, individual resources of the cloud provider network 90 (e.g., as hosted by services), features of services, documentation for services, products sold via one or more stores, and so on. In some embodiments, one or more of the indexes 130 may be specific to particular categories. For example, service names may have their own index 131, descriptive information (e.g., documentation, features, and so on) may have its own index 132, and so on. Using the search engine 120, results within a category may be ranked according to relevance so that only the most relevant results can be presented to the user 10. The search results may include up to a particular number (e.g., four) of results in any given category, e.g., the four most relevant services, the four most relevant resources, the four most relevant service features, the four most relevant elements of documentation, and/or the four most relevant resources. In some embodiments, less relevant results for a particular category may be hidden initially, and the user can choose to display these additional results by selecting a "display more" option.

In some embodiments, the unified search system 140 may include a search results overlay generator component 140 that generates a search results overlay to be displayed concurrently with the management console 60. The search results overlay may include information such as the most relevant service names 141, the most relevant elements of descriptive information 142, and so on. To reduce the cognitive burden on users, the search results overlay may include up to a particular number (e.g., four) of search results in any given category, e.g., the four most relevant services, the four most relevant resources, the four most relevant service features, the four most relevant elements of documentation, and/or the four most relevant resources. In some embodiments, a smaller number of search results and/or a smaller number of categories may be displayed on a mobile version of the console 60, e.g., via a client app on a smartphone or tablet. In some embodiments, the search results overlay on such a mobile device may display only one category of search results (e.g., services) by default due to the limited screen size. In some embodiments, the user of such a mobile device may page through to other categories of search results, e.g., by swiping right or left or using other suitable gestures or touchscreen input.

In some embodiments, the search results overlay may include a user interface element such as a card that "floats" atop elements of the management console 60. In some embodiments, the search results overlay may include a graphical user interface element such as a drop-down menu that is displayed below the search bar or other search interface 110 in which the textual input 121 was typed. The search results overlay may be displayed on top of some elements of the management console 60. The search results overlay may occlude (either totally or partially) some elements of the management console 60 that were previously visible, while other elements of the management console may remain visible. If the search results overlay is no longer displayed (e.g., the user presses "esc" or clicks on an "x" to close the overlay), then the original form of the management console 60 may be displayed again with no loss of information. By using the search results overlay to present the search results in a user interface element that is displayed concurrently with the management console 60, the unified search system 100 may avoid redirecting the user to a separate page of search results that would represent a loss of data, progress, or other context associated with the management console 60. By presenting the search results overlay and some portion of the management console 60 concurrently, the user 10 may quickly scan the search results and choose either to navigate to one of the results or to discard the search results and return to the management console 60 with no loss of information.

In some embodiments, the unified search system 100 may include an autosuggest or autocomplete feature. Using the autocomplete component, the unified search system 100 may determine and present one or more recommended terms based (at least in part) on initial textual input 121 from the user 10. For example, if the user types "ec," then the autocomplete component may generate an autocompleted term "ec2" and may display the autocompleted term in the search interface 110. In some embodiments, autocompleted terms may be determined using a component such as an Elasticsearch search engine. In some embodiments, the user 10 may accept the autocompleted search query using additional keyboard input, e.g., by pressing a particular arrow key to replace the user's initial textual input 121 with the autocompleted extension of that input. In some embodiments, the unified search system 100 may perform a new search as additional characters are added to the textual input 121 via the search interface 110. The additional characters may be added manually or by the user's acceptance of an autocompleted search query that extends the initial textual input. Results of the new search may be captured in a new or updated search results overlay and sent to the client device 20 for display. In some embodiments, the new overlay may replace any earlier overlays such that only one set of search results is displayed at a given point in time.

In some embodiments, the user 10 may select one of the service names 141 or elements of descriptive information 142 in the search results overlay, e.g., by clicking on the search result or navigating through the overlay and selecting the search result with arrow keys and the "enter" or "return" key. In some embodiments, a most relevant or highest ranked search result may be highlighted visually in the search results overlay, and a keypress of "enter" or "return" may select that item. The management console system 50 may generate a new user interface that includes the data of the selected element, e.g., a management console specific to the selected service or the full text of the selected element of descriptive information. This new user interface may replace the management console 60 and the search results overlay in the display 30. In some embodiments, the search interface 110 may continue to be included in the display 30. In some embodiments, the textual input 121 may be removed from the search interface 110. By using the unified search system 100 in this manner, the user 10 may quickly find and navigate to a particular service console or a particular element of descriptive information (e.g., for one or more services or resources). In some embodiments, the user 10 may find and navigate to a particular service console or a particular element of descriptive information using only keyboard input 40 to the search interface 110 and search results overlay.

In some embodiments, the console system 50 may be hosted by the cloud provider network 90. The console and/or unified search system 100 may be offered as a native service of a provider network 90 such that other services and resources of the provider network can easily leverage the search and navigation capabilities offered by the system. In some embodiments, one or more components of the unified search system 100 may be implemented using resources of a provider network, e.g., a cloud provider network 90. A cloud provider network (sometimes referred to simply as a "cloud") 90 refers to a pool of network-accessible computing resources (such as compute, storage, and networking resources, applications, and services), which may be virtualized or bare-metal. The cloud network 90 can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

A cloud provider network 90 can be formed as a number of regions, where a region is a separate geographical area in which the cloud provider clusters data centers. Each region can include two or more availability zones (AZs) connected to one another via a private high speed network, for example a fiber communication connection. An availability zone (also known as an availability domain, or simply a "zone") refers to an isolated failure domain including one or more data center facilities with separate power, separate networking, and separate cooling from those in another availability zone. A data center refers to a physical building or enclosure that houses and provides power and cooling to servers of the cloud provider network. Preferably, availability zones within a region are positioned far enough away from one other that the same natural disaster should not take more than one availability zone offline at the same time. Customers can connect to availability zones of the cloud provider network 90 via a publicly accessible network (e.g., the Internet, a cellular communication network) by way of a transit center (TC). TCs can be considered as the primary backbone locations linking customers to the cloud provider network, and may be collocated at other network provider facilities (e.g., Internet service providers, telecommunications providers) and securely connected (e.g. via a VPN or direct connection) to the availability zones. Each region can operate two or more TCs for redundancy. Regions are connected to a global network connecting each region to at least one other region. The cloud provider network 90 may deliver content from points of presence outside of, but networked with, these regions by way of edge locations and regional edge cache servers (points of presence, or PoPs). This compartmentalization and geographic distribution of computing hardware enables the cloud provider network 90 to provide low-latency resource access to customers on a global scale with a high degree of fault tolerance and stability.

The cloud provider network 90 may implement or host various computing services 95 and computing resources. The services 95 may include a virtual compute service, data processing service(s) (e.g., map reduce, data flow, and/or other large scale data processing techniques), data storage services (e.g., object storage services, block-based storage services, or data warehouse storage services) and/or any other type of network based services (which may include various other types of storage, processing, analysis, communication, event handling, visualization, and security services not illustrated). The resources required to support the operations of such services 95 (e.g., compute and storage resources) may be provisioned in an account associated with the cloud provider 90, in contrast to resources requested by users of the cloud provider network, which may be provisioned in user accounts. Computing resources, including storage resources, may be implemented using the resources of the cloud provider network 90.

Computing services 95 may implement various computing resources at one or more data centers. The computing services 95 can include an elastic compute cloud service (referred to in various implementations as an elastic compute service, a virtual machines service, a computing cloud service, a compute engine, or a cloud compute service). This service may offer virtual compute instances (also referred to as virtual machines, or simply "instances") with varying computational and/or memory resources, which are managed by a compute virtualization service (referred to in various implementations as an elastic compute service, a virtual machines service, a computing cloud service, a compute engine, or a cloud compute service). In one embodiment, each of the virtual compute instances may correspond to one of several instance types or families. An instance type may be characterized by its hardware type, computational resources (e.g., number, type, and configuration of central processing units [CPUs] or CPU cores), memory resources (e.g., capacity, type, and configuration of local memory), storage resources (e.g., capacity, type, and configuration of locally accessible storage), network resources (e.g., characteristics of its network interface and/or network capabilities), and/or other suitable descriptive characteristics (such as being a "burstable" instance type that has a baseline performance guarantee and the ability to periodically burst above that baseline, or a non-burstable or dedicated instance type that is allotted and guaranteed a fixed quantity of resources). Each instance type can have a specific ratio of processing, local storage, memory, and networking resources, and different instance families may have differing types of these resources as well. Multiple sizes of these resource configurations can be available within a given instance type. Using instance type selection functionality, an instance type may be selected for a customer, e.g., based (at least in part) on input from the customer. For example, a customer may choose an instance type from a predefined set of instance types. As another example, a customer may specify the desired resources of an instance type and/or requirements of a workload that the instance will run, and the instance type selection functionality may select an instance type based on such a specification. The disclosed placement techniques can select a suitable host for the requested instance type based at least partly on the described network performance metrics.

The computing services 95 can also include a container orchestration and management service (referred to in various implementations as a container service, cloud container service, container engine, or container cloud service). A container represents a logical packaging of a software application that abstracts the application from the computing environment in which the application is executed. For example, a containerized version of a software application includes the software code and any dependencies used by the code such that the application can be executed consistently on any infrastructure hosting a suitable container engine (e.g., the Docker® or Kubernetes® container engine). Compared to virtual machines (VMs), which emulate an entire computer system, containers virtualize at the operating system level and thus typically represent a more lightweight package for running an application on a host computing system. Existing software applications can be "containerized" by packaging the software application in an appropriate manner and generating other artifacts (e.g., a container image, container file, other configurations) used to enable the application to run in a container engine. A container engine can run on a virtual machine instance in some implementations, with the virtual machine instance selected based at least partly on the described network performance metrics.

The traffic and operations of the cloud provider network 90 may broadly be subdivided into two categories in various embodiments: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, system state information). The data plane includes customer resources that are implemented on the cloud provider network (e.g., computing instances, containers, block storage volumes, databases, file storage). Data plane traffic generally includes non-administrative operations such as transferring customer data to and from the customer resources. Certain control plane components (e.g., tier one control plane components such as the control plane for a virtualized computing service) are typically implemented on a separate set of servers from the data plane servers, while other control plane components (e.g., tier two control plane components such as analytics services) may share the virtualized servers with the data plane, and control plane traffic and data plane traffic may be sent over separate/distinct networks.

Computing services 95 may collaborate according to a service-oriented architecture, e.g., such that the functionality of the unified search system 100, the services 95, and/or the computing resources can be accessed by clients. In some embodiments, one or more aspects of the unified search system 100 may be implemented as a service offered within the provider network. The unified search system 100 may be implemented using a plurality of different instances that are distributed throughout one or more networks, and each instance may offer access to the functionality of the service to various clients. Because resources of the provider network 90 may be under the control of multiple clients (or tenants) simultaneously, the provider network may be said to offer multi-tenancy and may be termed a multi-tenant provider network. In some embodiments, the unified search system 100 may be implemented as a separate service from the management console service and may be used in other contexts within the provider network 90. For example, the unified search system 100 may be used with management consoles or portals for individual services that are executed locally on the client device 20. Search results may be generated in the provider network 90 using the unified search system 100 and sent to the client device 20 via one or more networks such as the Internet.

Figure 7:
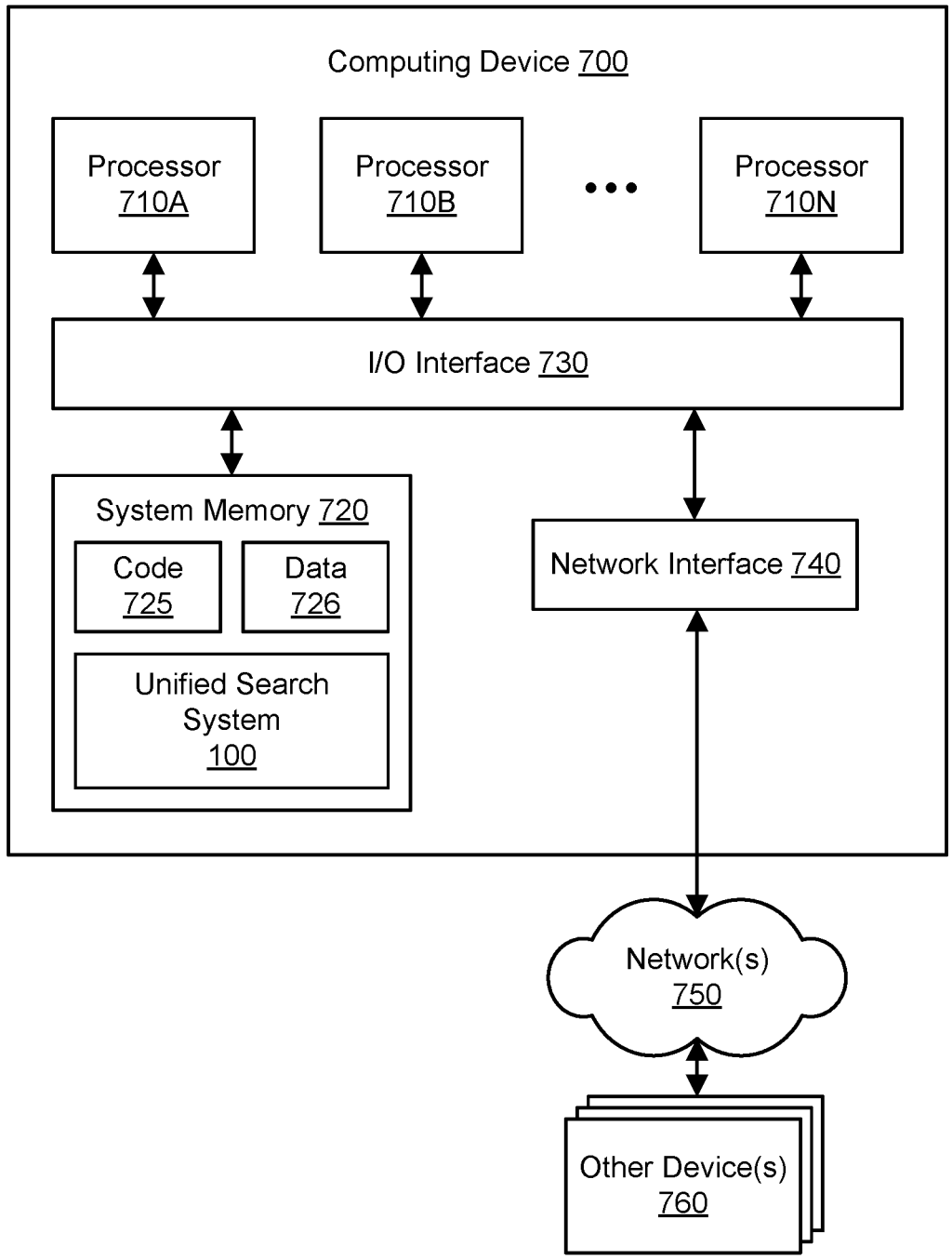
FIG. 7 illustrates an example computing device that may be used in some embodiments.

In various embodiments, components of the unified search system 100 may be implemented using any suitable number and configuration of computing devices, any of which may be implemented by the example computing device 700 illustrated in FIG. 7. In some embodiments, the computing devices may be located in any suitable number of data centers or geographical locations. In various embodiments, at least some of the functionality of the unified search system 100 may be provided by the same computing device or by different computing devices. In various embodiments, if any of the components of the unified search system 100 are implemented using different computing devices, then the components and their respective computing devices may be communicatively coupled, e.g., via one or more networks. Any of the components of the unified search system 100 may represent any combination of software and hardware usable to perform their respective functions. In some embodiments, operations implemented by the unified search system 100 may be performed automatically, e.g., without a need for user initiation or user intervention after an initial configuration stage, and/or programmatically, e.g., by execution of program instructions on at least one computing device. In some embodiments, the unified search system 100 may include additional components not shown, fewer components than shown, or different combinations, configurations, or quantities of the components shown.

A client 20 of the unified search system 100 may represent one or more external devices, systems, or entities with respect to the system. In one embodiment, the client devices may be implemented using any suitable number and configuration of computing devices, any of which may be implemented by the example computing device 700 illustrated in FIG. 7. Clients may convey network-based service requests to the unified search system 100 via one or more networks, e.g., to request searches. The service requests may include invocations of functionality of the unified search system 100 according to one or more application programming interfaces (APIs) or other programmatic interfaces of the unified search system. The network(s) may encompass any suitable combination of networking hardware and protocols necessary to establish network-based communications between client devices and the unified search system 100. For example, the network(s) may generally encompass the various telecommunications networks and service providers that collectively implement the Internet. In one embodiment, the network(s) may also include private networks such as local area networks (LANs) or wide area networks (WANs) as well as public or private wireless networks. For example, both a given client device and the unified search system 100 may be respectively provisioned within enterprises having their own internal networks. In one embodiment, the network(s) may include the hardware (e.g., modems, routers, switches, load balancers, proxy servers, etc.) and software (e.g., protocol stacks, accounting software, firewall/security software, etc.) necessary to establish a networking link between the given client device and the Internet as well as between the Internet and the unified search system 100. In one embodiment, client devices may communicate with the unified search system 100 using a private network rather than the public Internet. In various embodiments, the various components of the unified search system 100 may also communicate with other components of the system using one or more network interconnects.

Figure 2:
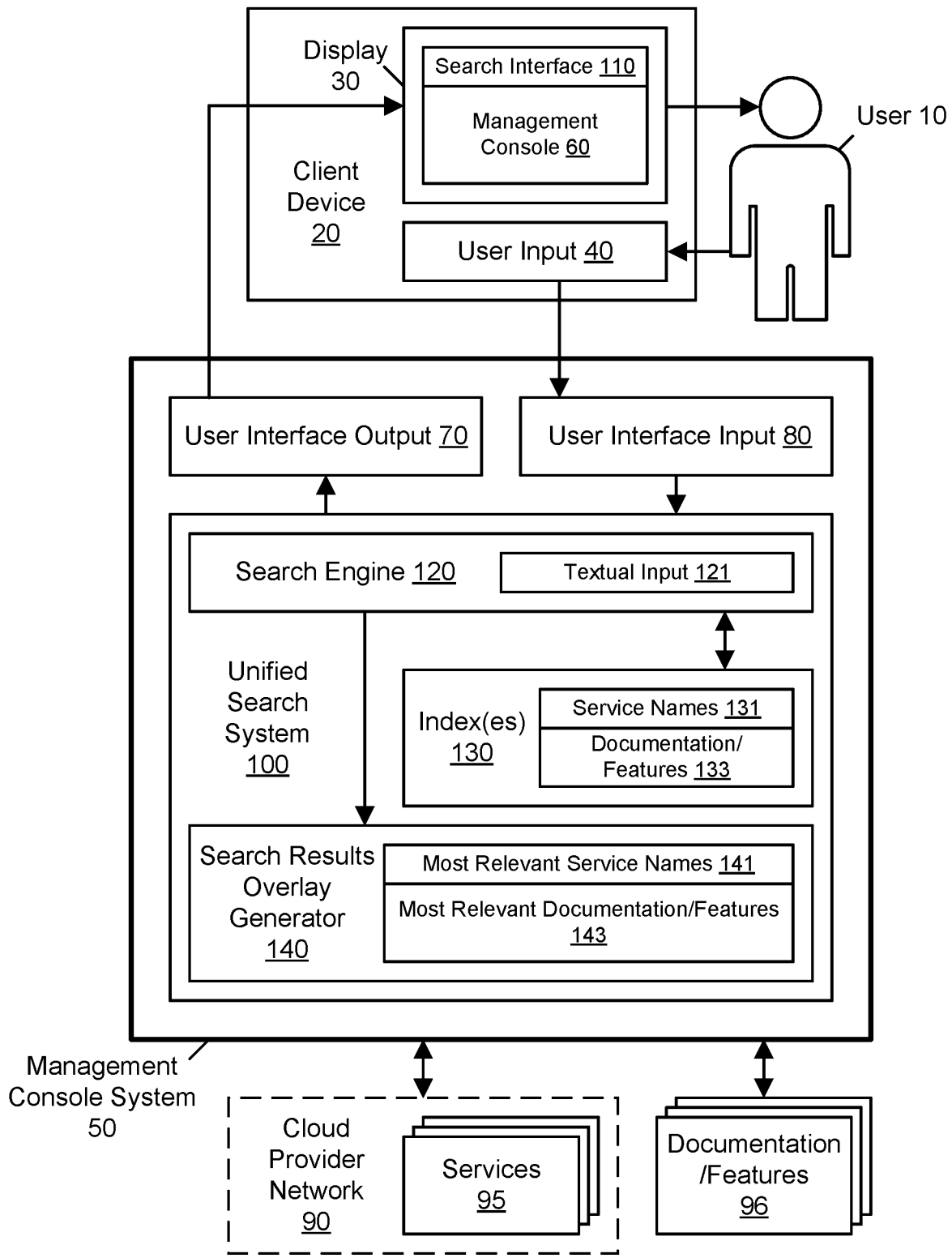
FIG. 2 illustrates further aspects of the example system environment for unified search and navigation for cloud-based services, including searching for documentation and features, according to some embodiments.

FIG. 2 illustrates further aspects of the example system environment for unified search and navigation for cloud-based services, including searching for documentation and features, according to some embodiments. As discussed above, the search engine 120 may determine search results in more than one category, such as individual services 95, individual resources of the cloud provider network 90 (e.g., as hosted by services), features of services, documentation for services, products sold via one or more stores, and so on. In some embodiments, one or more of the indexes 130 may be specific to particular categories. For example, service names may have their own index 131, documentation and/or features of services may have one or more additional indexes 133, and so on. The documentation/features index 133 may be generated based (at least in part) on ingestion of elements of documentation 96 and/or data describing service features. Using the Elasticsearch search engine or other search engine, results within a category may be ranked according to relevance so that only the most relevant results can be presented to the user 10. In the example of FIG. 2, the search results overlay may include information such as the most relevant service names 141, the most relevant elements of documentation and/or most relevant features 143, and so on. The search results overlay may include up to a particular number (e.g., four) of search results in any given category, e.g., the four most relevant services, the four most relevant resources, the four most relevant service features, the four most relevant elements of documentation, and/or the four most relevant resources.

In some embodiments, the user 10 may select one of the elements of documentation or features 143 in the search results overlay, e.g., by clicking on the search result or navigating and selecting the search result with arrow keys and the enter key. The management console system 50 may generate a new user interface that includes the data of the selected element, e.g., the body of the selected documentation or the full description of the selected feature. This new user interface may replace the management console 60 and the search results overlay in the display 30. In some embodiments, the search interface 110 may continue to be included in the display 30. In some embodiments, the textual input 121 may be removed from the search interface 110. By using the unified search system 100 in this manner, the user 10 may quickly find and navigate to a particular service console or a particular element of documentation or feature description (e.g., for one or more services or resources). In some embodiments, the user 10 may find and navigate to a particular service console or a particular element of documentation or feature description using only keyboard input 40 to the search interface 110 and search results overlay.

Figure 3:
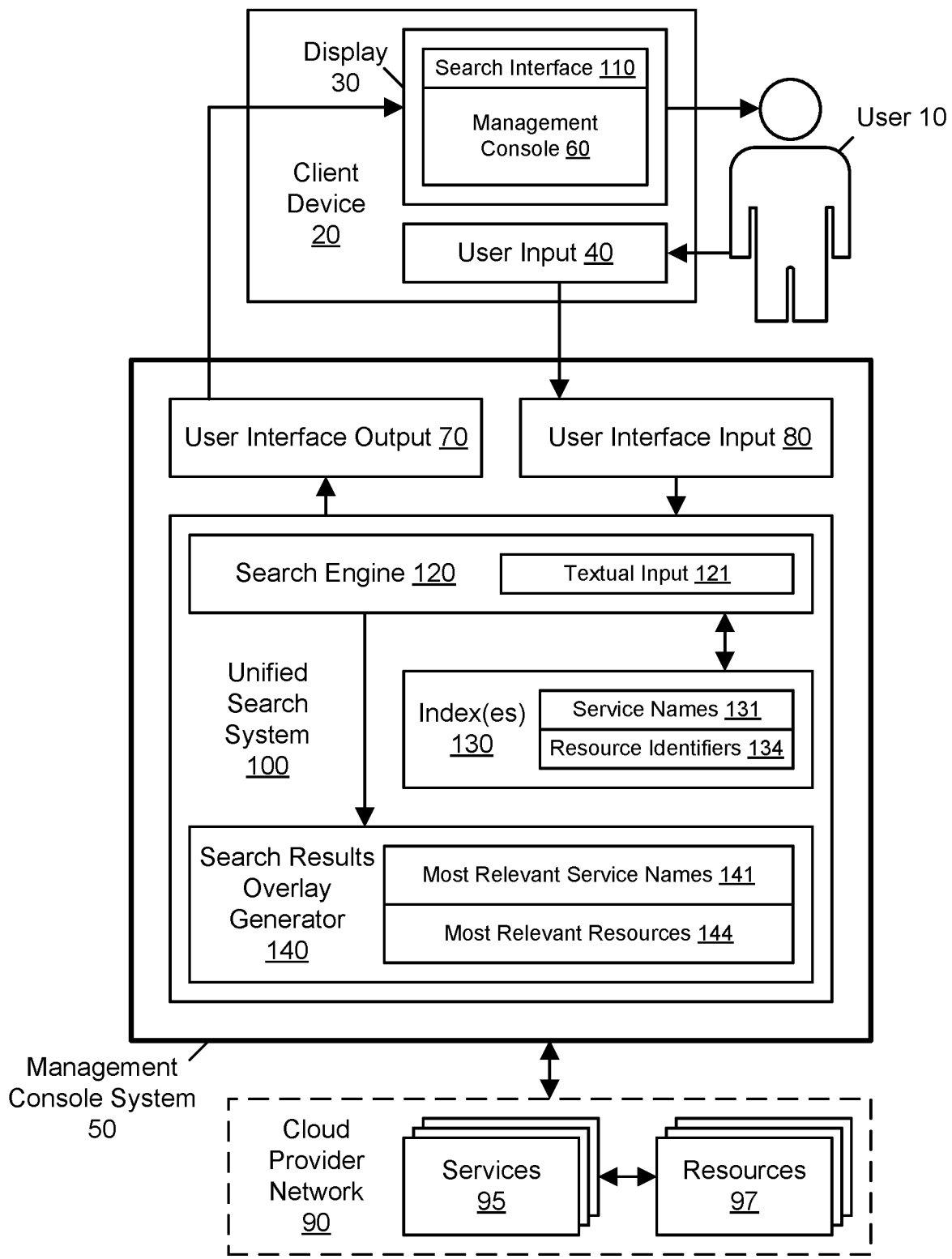
FIG. 3 illustrates further aspects of the example system environment for unified search and navigation for cloud-based services, including searching for resources, according to some embodiments.

FIG. 3 illustrates further aspects of the example system environment for unified search and navigation for cloud-based services, including searching for resources, according to some embodiments. As discussed above, the search engine 120 may determine search results in more than one category, such as individual services 95, individual resources 97 of the cloud provider network 90 (e.g., as hosted by services), features of services, documentation for services, products sold via one or more stores, and so on. In some embodiments, one or more of the indexes 130 may be specific to particular categories. For example, service names of services 95 may have their own index 131, identifiers of resources 97 hosted by services may have another index 134, and so on. The resources index 134 may be generated based (at least in part) on ingestion of resource identifiers, resource types, resource configurations, and so on. The resource information may be acquired using one or more application programming interfaces (APIs) of the provider network 90. Using the Elasticsearch search engine or other search engine, results within a category may be ranked according to relevance so that only the most relevant results can be presented to the user 10. In the example of FIG. 3, the search results overlay may include information such as the most relevant service names 141, the most relevant resources 144, and so on. The search results overlay may include up to a particular number (e.g., four) of search results in any given category, e.g., the four most relevant services, the four most relevant resources, the four most relevant service features, the four most relevant elements of documentation, and/or the four most relevant resources.

In some embodiments, the user 10 may select one of the resource identifiers 144 in the search results overlay, e.g., by clicking on the search result or navigating and selecting the search result with arrow keys and the enter key. The management console system 50 may generate a new user interface that includes the data of the selected element, e.g., a management console for the selected resource or other user interface elements suitable to view status information and/or configure the resource. This new user interface may replace the management console 60 and the search results overlay in the display 30. In some embodiments, the search interface 110 may continue to be included in the display 30. In some embodiments, the textual input 121 may be removed from the search interface 110. By using the unified search system 100 in this manner, the user 10 may quickly find and navigate to a particular service console or a particular resource. In some embodiments, the user 10 may find and navigate to a particular service console or a particular resource using only keyboard input 40 to the search interface 110 and search results overlay.

Figure 4:
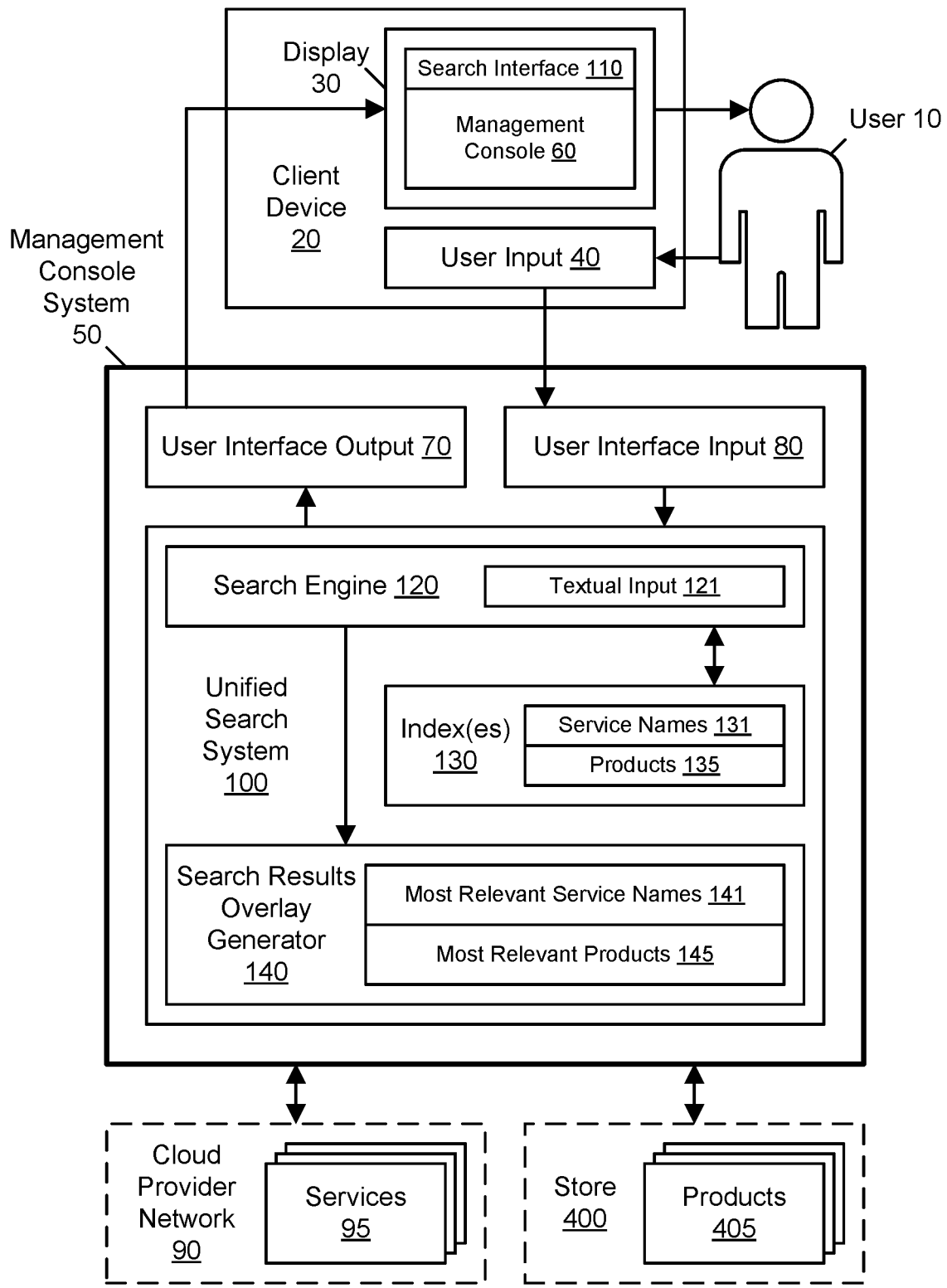
FIG. 4 illustrates further aspects of the example system environment for unified search and navigation for cloud-based services, including searching for products, according to some embodiments.

FIG. 4 illustrates further aspects of the example system environment for unified search and navigation for cloud-based services, including searching for products, according to some embodiments. As discussed above, the search engine 120 may determine search results in more than one category, such as individual services 95, individual products 405 offered via a store 400, individual resources, features of services, documentation for services, and so on. The store 400 may include a catalog of products 405 offered by one or more vendors. For example, via the store 400, vendors may offer program code or data associated with service architectures or resource configurations which the user 10 can apply to the user's own services or resources. Products may be offered for free or for specified fees.

In some embodiments, one or more of the indexes 130 may be specific to particular categories. For example, service names of services 95 may have their own index 131, products 405 may have another index 135, and so on. The product index 135 may be generated based (at least in part) on ingestion of product names and descriptions. The product information may be acquired using one or more application programming interfaces (APIs) of the store 400. Using the Elasticsearch search engine or other search engine, results within a category may be ranked according to relevance so that only the most relevant results can be presented to the user 10. In the example of FIG. 4, the search results overlay may include information such as the most relevant service names 141, the most relevant products 145, and so on. The search results overlay may include up to a particular number (e.g., four) of search results in any given category, e.g., the four most relevant services, the four most relevant resources, the four most relevant service features, the four most relevant elements of documentation, and/or the four most relevant resources.

In some embodiments, the user 10 may select one of the products 145 in the search results overlay, e.g., by clicking on the search result or navigating and selecting the search result with arrow keys and the enter key. The management console system 50 may generate a new user interface that includes the data of the selected element, e.g., a store page for the selected product. This new user interface may replace the management console 60 and the search results overlay in the display 30. In some embodiments, the search interface 110 may continue to be included in the display 30. In some embodiments, the textual input 121 may be removed from the search interface 110. By using the unified search system 100 in this manner, the user 10 may quickly find and navigate to a particular service console or a particular product in the store 400. In some embodiments, the user 10 may find and navigate to a particular service console or a particular product using only keyboard input 40 to the search interface 110 and search results overlay.

Figure 5:
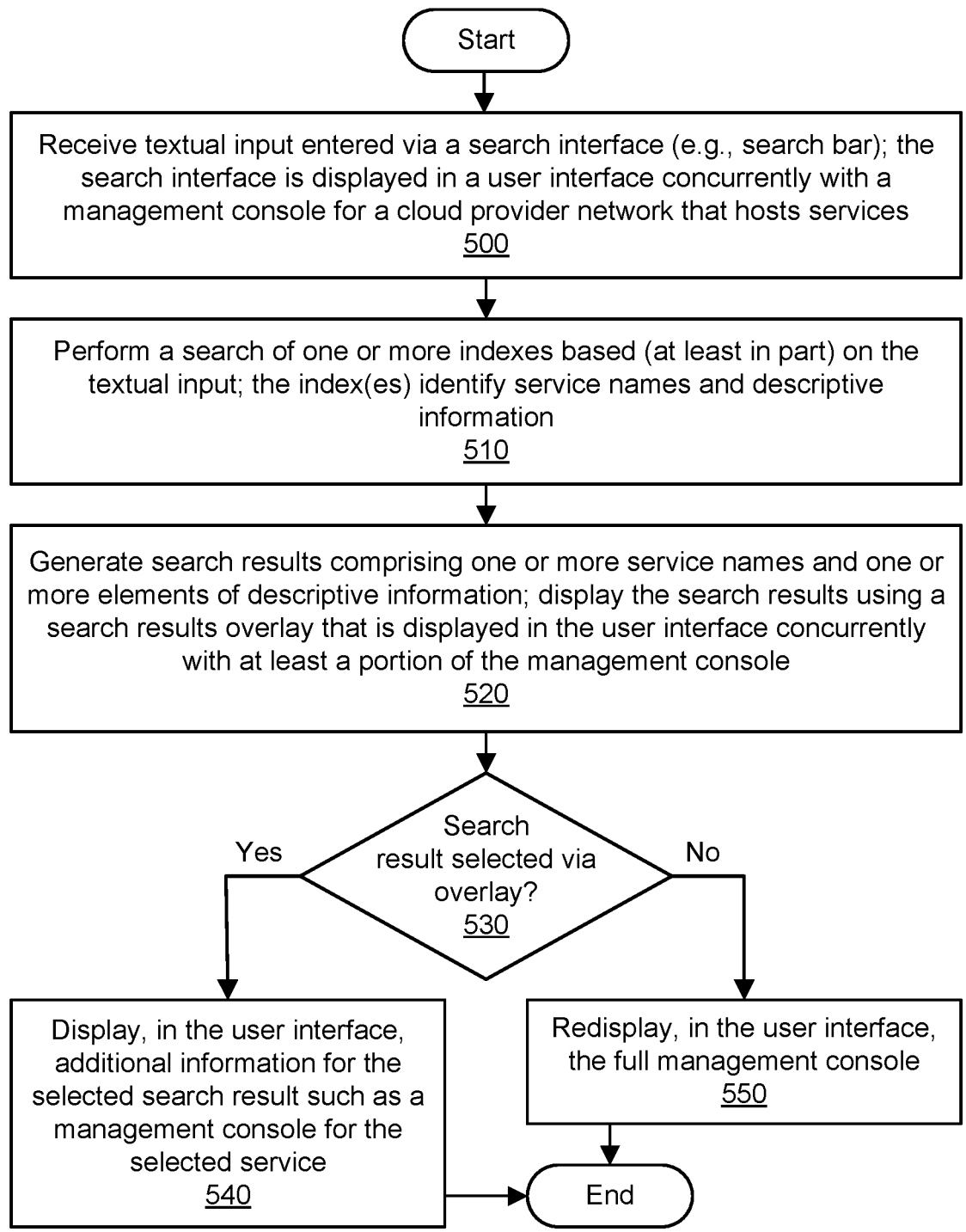
FIG. 5 is a flowchart illustrating a method for unified search and navigation for cloud-based services, according to some embodiments.

FIG. 5 is a flowchart illustrating a method for unified search and navigation for cloud-based services, according to some embodiments. A management console may be displayed in a user interface that permits users to view and configure aspects of services and resources hosted in a cloud provider network. For example, the provider network may host one or more computing virtualization services that host virtual compute instance and/or one or more storage virtualization services that host storage instances. When first accessed by a user during a session, the management console may represent a home page or high-level introduction to management of services and resources of the provider network. A search bar or other search interface may be displayed in a user interface concurrently with the management console for the cloud provider network, e.g., at the top of the user interface. As shown in 500, textual input may be received by a unified search system. The textual input may be entered via the search bar or other search interface, e.g., using keyboard-based input. In some embodiments, the search interface may be displayed in response to initial keyboard-based input, e.g., one or more keypresses such as "alt-s" or "option-s." In some embodiments, the textual input may be sent to a unified search system (e.g., over one or more networks such as the Internet) after a sufficient number of characters (e.g., two) and/or a sufficient amount of time has elapsed since the beginning of text entry. In some embodiments, the textual input may be sent to the unified search system after the "return" or "enter" key is pressed.

As shown in 510, a search of one or more indexes may be performed based (at least in part) on the textual input. The index(es) may be usable to determine service names of services and descriptive information for the services. The index(es) may be generated by a search engine (e.g., Elasticsearch) based on ingestion of data such as service names, service descriptions, features, documentation, product descriptions, resource identifiers, and so on. In some embodiments, individual indexes may correspond to categories of searchable items. For example, one or more of the indexes may be usable to quickly determine one or more service names that are relevant to the search query, and one or more of the indexes may be usable to quickly determine one or more elements of descriptive information that are relevant to the search query.

As shown in 520, search results of the search may be generated by the search engine and represented in a search results overlay. The search engine may determine search results in more than one category, such as individual services, individual resources of the cloud provider network (e.g., as hosted by services), features of services, documentation for services, products sold via one or more stores, and so on. For example, the search results may comprise a portion of the service names and a portion of the descriptive information. Using the search engine, results within a category may be ranked according to relevance so that only the most relevant results are initially presented to the user. The search results may be displayed in the user interface via a search results overlay. The search results overlay may include up to a particular number (e.g., four) of search results in any given category, e.g., the four most relevant services, the four most relevant resources, the four most relevant service features, the four most relevant elements of documentation, and/or the four most relevant resources. The search results overlay may be displayed concurrently with at least a portion of the management console for the cloud provider network. In some embodiments, the search results overlay may include a user interface element such as a card that "floats" atop elements of the management console. In some embodiments, the search results overlay may include a user interface element such as a drop-down menu that is displayed below the search bar or other search interface in which the textual input was typed. The search results overlay may be displayed on top of some elements of the management console. The search results overlay may occlude (either totally or partially) some elements of the management console that were previously visible, while other elements of the management console may remain visible.

As shown in 530, the method may determine whether additional input was entered via the search results overlay to select a particular one of the search results. In some embodiments, a most relevant or highest ranked search result may be highlighted visually in the search results overlay, and a keypress of "enter" or "return" may select that item. If a selection of one of the search results was received, then as shown in 540, responsive to the selection, a management console for the particular one of the search results or additional information for the particular one of the search results may be displayed in the user interface. By presenting the search results overlay and some portion of the management console concurrently, the user may quickly scan the search results and choose either to navigate to one of the results or to discard the search results and return to the management console with no loss of information. If a selection of one of the search results was not received within a sufficient timeout duration, or if user input was entered to hide or discard the search results overlay, then as shown in 550, the original management console may again be displayed in the user interface without a loss of data or context. By using the search results overlay to present the search results in a user interface element that is displayed concurrently with the management console, the unified search system may avoid redirecting the user to a separate page of search results that would represent a loss of data, progress, or other context associated with the management console.

Figure 6A:
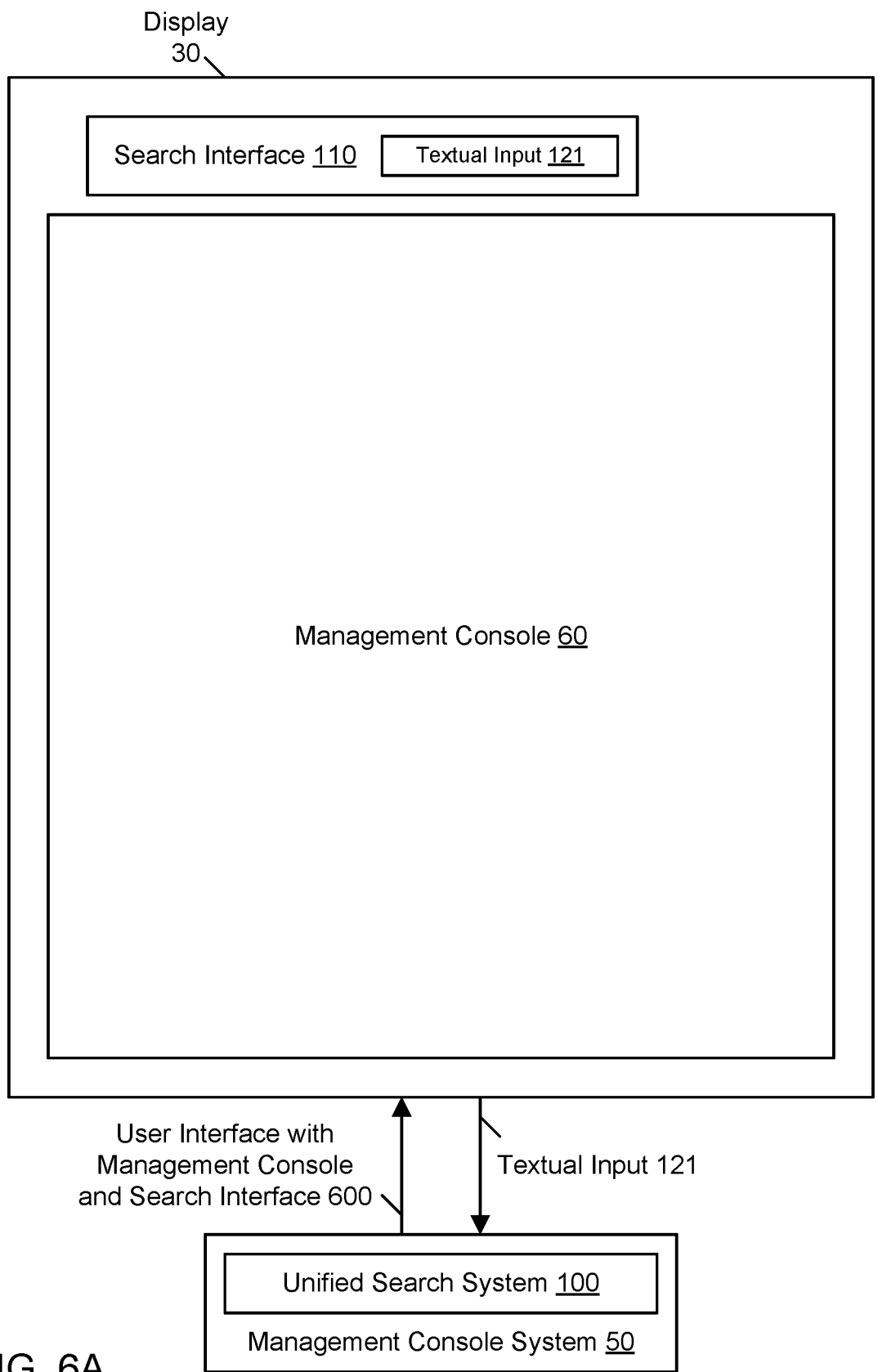
FIG. 6A an example of a search query entered by the user, according to some embodiments.

FIG. 6A an example of a search query entered by the user, according to some embodiments. A management console 60 may be displayed in a user interface display 30 that permits users to view and configure aspects of services and resources hosted in a cloud provider network 90. For example, the provider network 90 may host one or more computing virtualization services that host virtual compute instance and/or one or more storage virtualization services that host storage instances. When first accessed by a user during a session, the management console 60 may represent a home page or high-level introduction to management of services and resources of the provider network 90. A search bar or other search interface 110 may be displayed in a user interface associated with the management console 60, e.g., in response to a keypress. The search interface 110 may be displayed at the same time as information in the management console 60 itself. In some embodiments, the search interface 110 may be displayed in response to initial keyboard-based input, e.g., one or more keypresses such as "alt-s" or "option-s." The user interface 600 with the management console 60 and search interface 110 may be generated by the management console system 50 and sent to a client device 20 for display 30. Textual input 121 may be entered by the user via the search interface 110, e.g., using keyboard-based input. In some embodiments, the textual input 121 may be sent to the unified search system 100 (e.g., over one or more networks such as the Internet) after a sufficient number of characters (e.g., two) and/or a sufficient amount of time has elapsed since the beginning of text entry. In some embodiments, the textual input 121 may be sent to the unified search system 100 after the "return" or "enter" key is pressed.

Figure 6B:
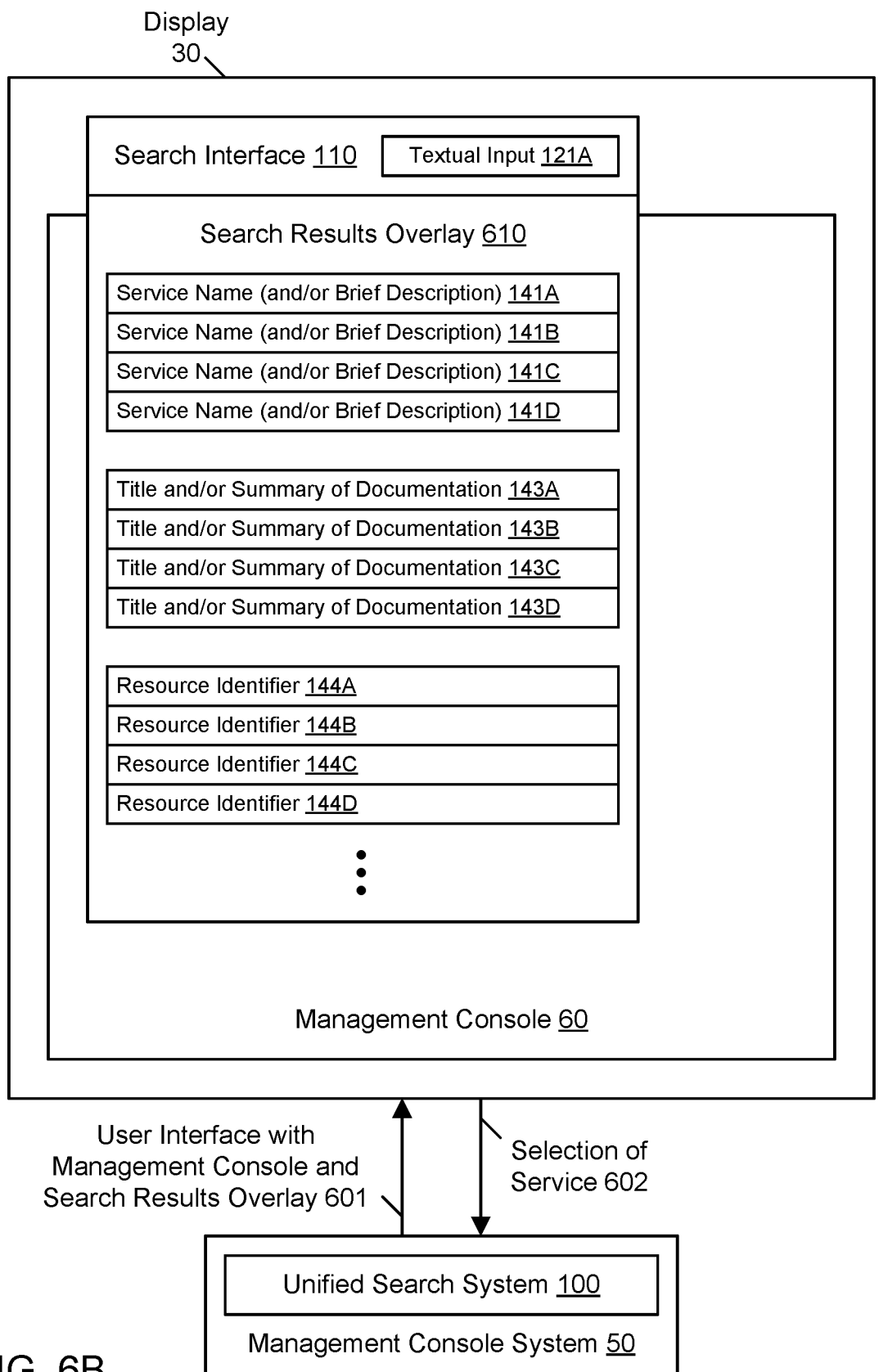
FIG. 6B illustrates an example of search results presented via an overlay in a management console, according to some embodiments.

FIG. 6B illustrates an example of search results presented via an overlay in a management console, according to some embodiments. In some embodiments, FIG. 6B represents a continuation of the example shown in FIG. 6A. After the user enters the textual input 121 into the search bar (e.g., at least two characters entered via keyboard), the unified search system 100 may generate a search results overlay 610 with the top search results in more than one category of searchable items, e.g., services, resources, features, documentation, products, and so on. In some embodiments, the user interface 601 with the management console 60 and search results overlay 601 may be generated by the management console system 50 and sent to the client device 20 for display 30. In some embodiments, only the search results overlay 610 may be sent to the client device 20 for display 30, and browser software on the client device may generate a composite display 30 comprising portions of the earlier-received console 60 and the newly received overlay 610.

Results within a category may be ranked according to relevance so that only the most relevant results are initially presented to the user. The search results overlay 610 may include up to a particular number (e.g., four) of search results in any given category. For example, as shown in FIG. 6B, the overlay 610 may include the four most relevant services (e.g., service name and/or brief description 141A, service name and/or brief description 141B, service name and/or brief description 141C, service name and/or brief description 141D), the four most relevant elements of documentation (e.g., title and/or summary of documentation 143A, title and/or summary of documentation 143B, title and/or summary of documentation 143C, title and/or summary of documentation 143D), the four most relevant resources (e.g., resource identifier 144A, resource identifier 144B, resource identifier 144C, resource identifier 144D), and/or other suitable combinations of items from the various searchable categories. In some embodiments, the categories presented in the overlay 610 may be selected based (at least in part) on the textual input 121 and the resulting search query. In some embodiments, not all of the categories may be represented in the overlay 610. In some embodiments, the order of the categories presented in the overlay 610 may be determined based (at least in part) on the textual input 121 and the resulting search query. In some embodiments, additional information such as summaries or tags may be displayed for individual search results or categories, e.g., when the user moves the cursor to that result or navigates to that result using the arrow keys. In some embodiments, the user 10 may scroll through the search results or jump to another category using suitable input, e.g., by using arrow keys with modifiers, page up and page down keys, and/or mouse or touchscreen input.

In some embodiments, the search results overlay 610 may include a user interface element such as a card that "floats" atop elements of the management console 60. In some embodiments, the search results overlay 610 may include a user interface element such as a drop-down menu that is displayed below the search interface 110 in which the textual input 121 was typed. The search results overlay 610 may be displayed on top of some elements of the management console 60. The search results overlay 610 may occlude or block the display of some elements of the management console 60 that were previously visible, while other elements of the management console may remain visible. If the search results overlay 610 is no longer displayed (e.g., the user presses "esc" or clicks on an "x" to close the overlay), then the full original form of the management console 60 may be displayed again with no loss of information. By using the search results overlay 610 to present the search results in a user interface element that is displayed concurrently with the management console 60, the unified search system 100 may avoid redirecting the user to a separate page of search results that would represent a loss of data, progress, or other context associated with the management console 60.

By presenting the search results overlay 610 and some portion of the management console 60 concurrently, the user 10 may quickly scan the search results and choose either to navigate to one of the results or to discard the search results and return to the management console 60 with no loss of information. For example, the user may select one of the services 141A-141D in the search results overlay 610, e.g., by clicking on the desired search result or navigating through the overlay and selecting the search result with arrow keys and the "enter" or "return" key. In some embodiments, a most relevant or highest ranked search result may be highlighted visually in the search results overlay, and a keypress of "enter" or "return" may automatically select that item. The client device 20 may send input representing a selection 602 of that service to the management console system 50.

Figure 6C:
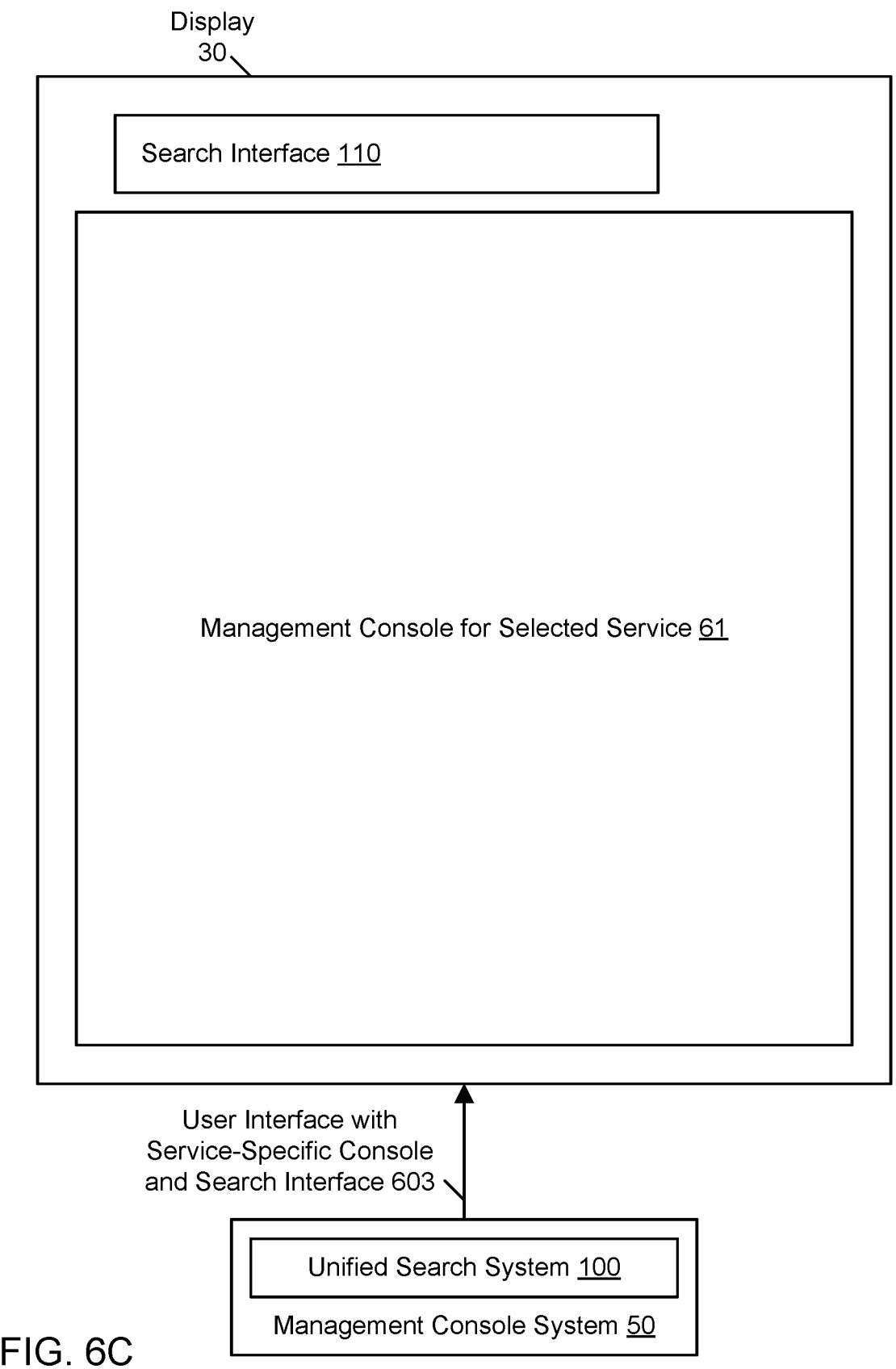
FIG. 6C illustrates an example of a display of additional information responsive to the user selecting a search result, according to some embodiments.

FIG. 6C illustrates an example of a display of additional information responsive to the user selecting a search result, according to some embodiments. In some embodiments, FIG. 6C represents a continuation of the example shown in FIG. 6B. The management console system 50 may generate a new user interface 603 that includes additional information associated with the selected service, e.g., a management console 61 specific to the selected service. This new user interface 603 may replace the higher-level management console 60 and the search results overlay 610 in the display 30. In some embodiments, the search interface 110 may continue to be part of the user interface 603 and included in the display 30. In some embodiments, the textual input 121 may be removed from the search interface 110. By using the unified search system 100 in this manner, the user 10 may quickly find and navigate to a particular service console 61. In some embodiments, the user 10 may find and navigate to a particular service console 61 information using only keyboard input to the search interface 110 and search results overlay 610.

Illustrative Computer System

In at least some embodiments, a computer system that implements a portion or all of one or more of the technologies described herein may include a computer system that includes or is configured to access one or more computer-readable media. FIG. 7 illustrates such a computing device 700 according to one embodiment. In the illustrated embodiment, computing device 700 includes one or more processors 710A-710N coupled to a system memory 720 via an input/output (I/O) interface 730. In one embodiment, computing device 700 further includes a network interface 740 coupled to I/O interface 730.

In various embodiments, computing device 700 may be a uniprocessor system including one processor or a multiprocessor system including several processors 710A-710N (e.g., two, four, eight, or another suitable number). In one embodiment, processors 710A-710N may include any suitable processors capable of executing instructions. For example, in various embodiments, processors 710A-710N may be processors implementing any of a variety of instruction set architectures (ISAs), such as the x86, PowerPC, SPARC, or MIPS ISAs, or any other suitable ISA. In one embodiment, in multiprocessor systems, each of processors 710A-710N may commonly, but not necessarily, implement the same ISA.

In one embodiment, system memory 720 may be configured to store program instructions and data accessible by processor(s) 710A-710N. In various embodiments, system memory 720 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 720, e.g., as code (i.e., program instructions) 725 and data 726. In the illustrated embodiment, program code implementing aspects of the unified search system 100 may be stored in system memory 720.

In one embodiment, I/O interface 730 may be configured to coordinate I/O traffic between processors 710A-710N, system memory 720, and any peripheral devices in the device, including network interface 740 or other peripheral interfaces. In some embodiments, I/O interface 730 may perform any necessary protocol, timing or other data transformations to convert data signals from one component (e.g., system memory 720) into a format suitable for use by another component (e.g., processors 710A-710N). In some embodiments, I/O interface 730 may include support for devices attached through various types of peripheral buses, such as a variant of the Peripheral Component Interconnect (PCI) bus standard or the Universal Serial Bus (USB) standard, for example. In some embodiments, the function of I/O interface 730 may be split into two or more separate components, such as a north bridge and a south bridge, for example. In some embodiments, some or all of the functionality of I/O interface 730, such as an interface to system memory 720, may be incorporated directly into processors 710A-710N.

In one embodiment, network interface 740 may be configured to allow data to be exchanged between computing device 700 and other devices 760 attached to a network or networks 750. In various embodiments, network interface 740 may support communication via any suitable wired or wireless general data networks, such as types of Ethernet network, for example. Additionally, in some embodiments, network interface 740 may support communication via telecommunications/telephony networks such as analog voice networks or digital fiber communications networks, via storage area networks such as Fibre Channel SANs, or via any other suitable type of network and/or protocol.

In some embodiments, system memory 720 may be one embodiment of a computer-readable (i.e., computer-accessible) medium configured to store program instructions and data as described above for implementing embodiments of the corresponding methods and apparatus. In some embodiments, program instructions and/or data may be received, sent or stored upon different types of computer-readable media. In some embodiments, a computer-readable medium may include non-transitory storage media or memory media such as magnetic or optical media, e.g., disk or DVD/CD coupled to computing device 700 via I/O interface 730. In one embodiment, a non-transitory computer-readable storage medium may also include any volatile or non-volatile media such as RAM (e.g. SDRAM, DDR SDRAM, RDRAM, SRAM, etc.), ROM, etc., that may be included in some embodiments of computing device 700 as system memory 720 or another type of memory. In one embodiment, a computer-readable medium may include transmission media or signals such as electrical, electromagnetic, or digital signals, conveyed via a communication medium such as a network and/or a wireless link, such as may be implemented via network interface 740. The described functionality may be implemented using one or more non-transitory computer-readable storage media storing program instructions that are executed on or across one or more processors. Portions or all of multiple computing devices such as that illustrated in FIG. 7 may be used to implement the described functionality in various embodiments; for example, software components running on a variety of different devices and servers may collaborate to provide the functionality in one embodiment. In some embodiments, portions of the described functionality may be implemented using storage devices, network devices, or various types of computer systems. In various embodiments, the term "computing device," as used herein, refers to at least all these types of devices, and is not limited to these types of devices.

The various methods as illustrated in the Figures and described herein represent examples of embodiments of methods. In various embodiments, the methods may be implemented in software, hardware, or a combination thereof. In various embodiments, in various ones of the methods, the order of the steps may be changed, and various elements may be added, reordered, combined, omitted, modified, etc. In various embodiments, various ones of the steps may be performed automatically (e.g., without being directly prompted by user input) and/or programmatically (e.g., according to program instructions).

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

It will also be understood that, although the terms first, second, etc., may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

Numerous specific details are set forth herein to provide a thorough understanding of claimed subject matter. However, it will be understood by those skilled in the art that claimed subject matter may be practiced without these specific details. In other instances, methods, apparatus, or systems that would be known by one of ordinary skill have not been described in detail so as not to obscure claimed subject matter. Various modifications and changes may be made as would be obvious to a person skilled in the art having the benefit of this disclosure. It is intended to embrace all such modifications and changes and, accordingly, the above description is to be regarded in an illustrative rather than a restrictive sense.

What is claimed is:

1. A system, comprising:
a unified search system comprising one or more processors and one or more memories to store computer-executable instructions that, when executed, cause the one or more processors to:
receive textual input entered via a search interface, wherein the search interface is displayed in a user interface concurrently with a management console for a cloud provider network, wherein the cloud provider network hosts a plurality of services, and wherein at least a portion of the services host a plurality of resources;
perform a search of one or more indexes based at least in part on the textual input, wherein the one or more indexes are usable to determine service names of the plurality of services and descriptive information for the plurality of services;
generate search results of the search, wherein the search results comprise a portion of the service names and a portion of the descriptive information, and wherein the search results are displayed in the user interface via a search results overlay, wherein the search results overlay is displayed concurrently over at least a portion of the management console for the cloud provider network without a loss of data displayed in the management console and wherein the search results overlay occludes the portion of the management console for the cloud provider network over which the portion is displayed; and
receive additional input entered via the search results overlay, wherein the additional input comprises a selection of a particular one of the search results, and wherein, responsive to the selection, a management console for the particular one of the search results or additional information for the particular one of the search results is displayed in the user interface.

2. The system as recited in claim 1, wherein the one or more indexes are usable to determine resource identifiers of individual ones of the plurality of resources, and wherein the search results comprise one or more of the resource identifiers.

3. The system as recited in claim 1, wherein the descriptive information comprises elements of documentation for the plurality of services or features of the plurality of services, and wherein the search results comprise one or more links to one or more of the elements of documentation or one or more descriptions of one or more of the features.

4. The system as recited in claim 1, wherein the one or more memories store additional computer-executable instructions that, when executed, cause the one or more processors to:
determine one or more autocompleted terms comprising the textual input and additional text, wherein the one or more autocompleted terms are displayed using the search interface.

5. A method, comprising:
receiving, by a unified search system, textual input entered using a search interface, wherein the search interface is displayed in a user interface associated with management of a plurality of services hosted by a provider network;
performing, by the unified search system, a search using one or more indexes based at least in part on the textual input, wherein the one or more indexes are usable to determine service names of the plurality of services and descriptive information for the plurality of services;
generating, by the unified search system, search results of the search, wherein the search results comprise a portion of the service names and a portion of the descriptive information, and wherein the search results are displayed using a search results overlay, wherein the search results overlay is displayed concurrently over at least a portion of the user interface associated with management of the plurality of services hosted by the provider network without a loss of data displayed in the user interface and wherein the search results overlay occludes occludes the portion of the management console for the cloud provider network over which the portion is displayed; and
receiving, by the unified search system, additional input entered using the search results overlay, wherein the additional input comprises a selection of a particular one of the search results, and wherein, responsive to the selection, additional information associated with the particular one of the search results is displayed.

6. The method as recited in claim 5, wherein the plurality of services host a plurality of resources, wherein the one or more indexes are usable to determine resource identifiers of individual ones of the plurality of resources, and wherein the search results comprise one or more of the resource identifiers.

7. The method as recited in claim 5, wherein the descriptive information comprises elements of documentation for the plurality of services, and wherein the search results comprise one or more links to one or more of the elements of documentation.

8. The method as recited in claim 5, wherein the descriptive information comprises features of the plurality of services, and wherein the search results comprise one or more descriptions of one or more of the features.

9. The method as recited in claim 5, wherein the one or more indexes are usable to determine identifiers of products offered via a store, and wherein the search results comprise one or more of the products.

10. The method as recited in claim 5, further comprising:
determining, by the unified search system, one or more autocompleted terms comprising the textual input and additional text, wherein the one or more autocompleted terms are displayed using the search interface.

11. The method as recited in claim 5, wherein a first search result of the plurality of search results is highlighted in the search results overlay, wherein the additional input comprises a selection of the first search result, and wherein the additional input comprises keyboard input.

12. The method as recited in claim 5, wherein the search interface is hidden and redisplayed responsive to keyboard input.

13. One or more non-transitory computer-readable storage media storing program instructions that, when executed on or across one or more processors, perform:
receiving, by a unified search system from a client device via a network, textual input entered via a search interface, wherein the search interface is displayed in a user interface on the client device concurrently with a console for a multi-tenant provider network, and wherein the multi-tenant provider network comprises a plurality of services;
performing, by the unified search system, a search of a plurality of indexes based at least in part on the textual input, wherein the plurality of indexes are usable to determine service names of the plurality of services and descriptive information for the plurality of services;
generating, by the unified search system, search results of the search, wherein the search results comprise one or more the service names and one or more elements of the descriptive information, and wherein the search results are sent to the client device over the network and displayed in the user interface via a search results overlay, wherein the search results overlay is displayed concurrently over at least a portion of the console for the multi-tenant provider network without a loss of data displayed in the console and wherein the search results overlay occludes occludes the portion of the management console for the cloud provider network over which the portion is displayed; and
receiving, by the unified search system, additional input entered via the search results overlay, wherein the additional input comprises a selection of a particular one of the search results, and wherein, responsive to the selection, a console for the particular one of the search results is displayed in the user interface.

14. The one or more non-transitory computer-readable storage media as recited in claim 13, wherein the plurality of services host a plurality of resources, wherein the plurality of indexes are usable to determine resource identifiers of individual ones of the plurality of resources, and wherein the search results comprise one or more of the resource identifiers.

15. The one or more non-transitory computer-readable storage media as recited in claim 13, wherein the descriptive information comprises elements of documentation for the plurality of services, and wherein the search results comprise one or more links to one or more of the elements of documentation.

16. The one or more non-transitory computer-readable storage media as recited in claim 13, the descriptive information comprises features of the plurality of services, and wherein the search results comprise one or more descriptions of one or more of the features.

17. The one or more non-transitory computer-readable storage media as recited in claim 13, wherein the plurality of indexes are usable to determine identifiers of products offered by a plurality of vendors via a store, and wherein the search results comprise one or more of the products.

18. The one or more non-transitory computer-readable storage media as recited in claim 13, further comprising additional program instructions that, when executed on or across the one or more processors, perform:
determining, by the unified search system, one or more autocompleted terms comprising the textual input and additional text, wherein the one or more autocompleted terms are displayed using the search interface.

19. The one or more non-transitory computer-readable storage media as recited in claim 13, wherein a highest ranked search result of the plurality of search results is highlighted in the search results overlay, wherein the additional input comprises a selection of the highest ranked search result, and wherein the additional input comprises keyboard input.

20. The one or more non-transitory computer-readable storage media as recited in claim 13, wherein search results overlay is displayed without loading a search results page separate from the console for the multi-tenant provider network.

* * * * *